(12) United States Patent
Church et al.

(10) Patent No.: US 12,333,042 B2
(45) Date of Patent: Jun. 17, 2025

(54) SYSTEM, METHOD, AND COMPUTER DEVICE FOR DATA INTEGRITY VALIDATION

(71) Applicant: 10353744 Canada Ltd., Kitchener (CA)

(72) Inventors: Mark Church, Waterloo (CA); Zachary Packull, Cambridge (CA)

(*) Notice: Subject to any disclaimer, the term of this patent is extended or adjusted under 35 U.S.C. 154(b) by 216 days.

(21) Appl. No.: 18/323,485

(22) Filed: May 25, 2023

(65) Prior Publication Data

US 2023/0385438 A1 Nov. 30, 2023

Related U.S. Application Data

(60) Provisional application No. 63/345,587, filed on May 25, 2022.

(51) Int. Cl.
*G06F 21/62* (2013.01)
*G06F 21/60* (2013.01)
*G06Q 30/08* (2012.01)

(52) U.S. Cl.
CPC ........ *G06F 21/6227* (2013.01); *G06F 21/604* (2013.01); *G06Q 30/08* (2013.01)

(58) Field of Classification Search
CPC .... G06F 21/6227; G06F 21/604; G06Q 30/08
USPC ........................................................ 726/26
See application file for complete search history.

(56) References Cited

U.S. PATENT DOCUMENTS

| | | | | |
|---|---|---|---|---|
| 7,565,313 B2* | 7/2009 | Waelbroeck | ........... | G06Q 40/03 705/37 |
| 7,865,187 B2* | 1/2011 | Ramer | ............... | G06Q 30/0256 705/14.52 |
| 8,024,317 B2* | 9/2011 | Nair | .................... | G06Q 30/0275 705/37 |
| 10,546,326 B2* | 1/2020 | Publicover | ......... | H04N 21/6582 |
| 10,942,919 B2* | 3/2021 | Williams | ............. | G06F 16/3329 |
| 11,127,048 B2* | 9/2021 | Publicover | ......... | G06Q 30/0269 |
| 11,139,958 B2* | 10/2021 | Smith | .................... | G06N 5/022 |
| 2004/0034591 A1* | 2/2004 | Waelbroeck | ....... | G06Q 30/0255 705/37 |
| 2007/0061211 A1* | 3/2007 | Ramer | .................... | G06Q 30/02 705/25 |
| 2009/0281954 A1* | 11/2009 | Waelbroeck | ....... | G06Q 30/0255 705/37 |

(Continued)

*Primary Examiner* — Samson B Lemma
(74) *Attorney, Agent, or Firm* — Own Innovation Inc.; James W. Hinton

(57) ABSTRACT

A system, method, and device for data integrity validation are provided. The system includes a database for storing user data, a black box device for locally answering queries received from an end user device without revealing the stored user data, and end user device. The black box device includes memory for storing the user data, data filters, filtered data, the queries received from the end user device, query results, and excluded query result data and processor in communication with the memory. Processor is configured to generate the filtered data, determine whether each query received that addresses the filtered data is permitted, provide a response to each permitted query based on the generated filtered data, generate the excluded query result data by excluding stored user data that would facilitate identifying any user from the response to each permitted query, and transmit the excluded query result data to the end user device.

17 Claims, 6 Drawing Sheets

(56) References Cited

U.S. PATENT DOCUMENTS

| | | | |
|---|---|---|---|
| 2016/0253710 A1* | 9/2016 | Publicover | H04W 4/21 |
| | | | 705/14.66 |
| 2017/0201779 A1* | 7/2017 | Publicover | H04N 21/4532 |
| 2020/0349610 A1* | 11/2020 | Publicover | H04L 67/306 |
| 2020/0349611 A1* | 11/2020 | Publicover | H04N 21/252 |
| 2021/0248136 A1* | 8/2021 | Panuganty | G06F 16/972 |
| 2022/0036405 A1* | 2/2022 | Publicover | H04W 4/21 |
| 2023/0145903 A1* | 5/2023 | Robert Jose | G06N 20/00 |
| | | | 715/700 |

\* cited by examiner

SYSTEM, METHOD, AND COMPUTER DEVICE FOR DATA INTEGRITY VALIDATION

TECHNICAL FIELD

The following relates generally to data integrity validation, and more particularly to systems, methods, and devices for allowing users to control access to their data across services and platforms.

INTRODUCTION

A common concern of users and clients of various electronic and Internet-based services and platforms is a lack of control over the privacy and security of user data. Where user data may be sold, transmitted, repackaged, and reused without user consent, it is often difficult if not impossible to safeguard one's digital anonymity and ensure sensitive personal information is not leaked. Even where users provide consent, such consent is often in the form of a blanket agreement in order to gain access to a service or platform, and so users still lack control over their own data. Oftentimes when a user will not grant such consent, it becomes impossible for the user to fully participate in the digital economy and infrastructure underpinning most modern electronic services and platforms.

Accordingly, there is a need for allowing users to control their data. Specifically, there is a need for allowing users to meaningfully permit certain uses of user data and/or to prohibit entities from using certain user data in certain ways. There is a further need for allowing users to know where and to whom their data is being transmitted and how that data is to be used.

Accordingly, there is a need for preventing unauthorized, unwanted, and unwarranted copying and subsequent transmission of user data.

SUMMARY

A system for data integrity validation is provided. The system includes a user database for storing user data of a user and a black box device for locally answering queries received from an end user device without revealing the stored user data. The black box device includes a memory for storing the user data, data filters, filtered data, the queries received from the end user device, results of the queries, and excluded query result data and a processor in communication with the memory. The processor is configured to generate the filtered data based on the stored user data and the data filters, determine whether each query received that addresses the filtered data is permitted based on properties of the query, determine whether the query, if answered locally, would produce a result that would facilitate identifying any particular user, provide a response to each permitted query based on the generated filtered data, generate the excluded query result data by excluding from the response to each permitted query non-permitted stored user data and stored user data that would facilitate identifying any particular user, and transmit the excluded query result data to the end user device. The system further includes the end user device configured to receive the queries from an end user, transmit the queries to the black box device, and display the excluded query result data to the end user.

The black box device may include a permissions matrix for storing circumstances under which the user allows the user data to be used to respond to the queries, and the user data is not used to respond to the queries unless circumstances provided by the end user device are included in the permissions matrix.

The permissions matrix may notify the user when the circumstances provided by the end user device are not included in the permissions matrix. The permissions matrix may be configured to receive permission from the user to allow the user data to be used to respond to the queries when the circumstances provided by the end user device are included in the permissions matrix.

Use by the end user of the excluded query result data may be audited to confirm that the use by the end user matches the circumstances provided by the end user device.

The black box device may further include a minimum bid amount for which the user allows the user data to be used to respond to the queries, and the user data is not used to respond to the queries unless a bid by the end user device meets or exceeds the minimum bid amount.

The minimum bid amount may include a first minimum bid amount for anonymous disclosure of the user data, a second minimum bid amount for semi-anonymous disclosure of the user data, the second minimum bid amount being higher than the first minimum bid amount, and a third minimum bid amount for non-anonymous disclosure of the user data, the third minimum bid amount being higher than the second minimum bid amount.

The system may further include a user device for providing the user data.

The user data may be gathered from any one or more of online activities of the user, purchase patterns of the user, and physical movement of the user.

A method for facilitating data integrity validation is provided. The method includes receiving user data pertaining to one or more users, receiving data filters to be applied to the user data, applying the data filters to the user data to generate filtered data, receiving a query from an end user device, determining whether the query received is permitted based on properties of the query, determining whether the query, if answered locally, would produce a result that would facilitate identifying any particular user, providing a response to the permitted query using the filtered data, generating excluded query result data by excluding from the response to each permitted query non-permitted user data and user data that would facilitate identifying any particular user, and transmitting the excluded query result data to the end user.

The method may further include storing circumstances under which the user allows the user data to be used to respond to the query in a permissions matrix and not allowing the user data to be used to respond to the query unless circumstances provided by the end user are included in the permissions matrix.

The permissions matrix may notify the user when the circumstances provided by the end user device are not included in the permissions matrix. The permissions matrix may receive permission from the user to allow the user data to be used to respond to the queries when the circumstances provided by the end user device are included in the permissions matrix.

The method may further include auditing use by the end user of the excluded query result data to confirm that the use by the end user matches the circumstances provided by the end user device.

The method may further include allowing the user data to be used to respond to the queries when a bid by the end user exceeds a minimum bid amount and not allowing the user data to be used to respond to the query if the bid by the end user device does not meet or exceed the minimum bid amount.

The minimum bid amount may include a first minimum bid amount for anonymous disclosure of the user data, a second minimum bid amount for semi-anonymous disclosure of the user data, the second minimum bid amount being higher than the first minimum bid amount, and a third minimum bid amount for non-anonymous disclosure of the user data, the third minimum bid amount being higher than the second minimum bid amount.

A black box device for locally answering queries received from an end user device without revealing stored user data of a user is provided. The black box device includes a memory for storing the user data, data filters, filtered data, the queries received from the end user device, results of the queries, and excluded query result data and a processor in communication with the memory. The processor is configured to generate the filtered data based on the stored user data and the data filters, determine whether each query received that addresses the filtered data is permitted based on properties of the query, determine whether the query, if answered locally, would produce a result that would facilitate identifying any particular user, provide a response to each permitted query based on the generated filtered data, generate the excluded query result data by excluding from the response to each permitted query non-permitted stored user data and stored user data that would facilitate identifying any particular user, and transmit the excluded query result data to the end user device.

The black box device may further include a permissions matrix for storing circumstances under which the user allows the user data to be used to respond to the queries, and the user data is not used to respond to the queries unless circumstances provided by the end user are included in the permissions matrix.

The permissions matrix may notify the user when the circumstances provided by the end user device are not included in the permissions matrix. The permissions matrix may be configured to receive permission from the user to allow the user data to be used to respond to the queries when the circumstances provided by the end user device are included in the permissions matrix.

Use by the end user of the excluded query result data may be audited to confirm that the use by the end user matches the circumstances provided by the end user device.

The black box device may further include a minimum bid amount for which the user allows the user data to be used to respond to the queries, and the user data is not used to respond to the queries unless a bid by the end user device meets or exceeds the minimum bid amount.

The minimum bid amount may include a first minimum bid amount for anonymous disclosure of the user data, a second minimum bid amount for semi-anonymous disclosure of the user data, the second minimum bid amount being higher than the first minimum bid amount, and a third minimum bid amount for non-anonymous disclosure of the user data, the third minimum bid amount being higher than the second minimum bid amount.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
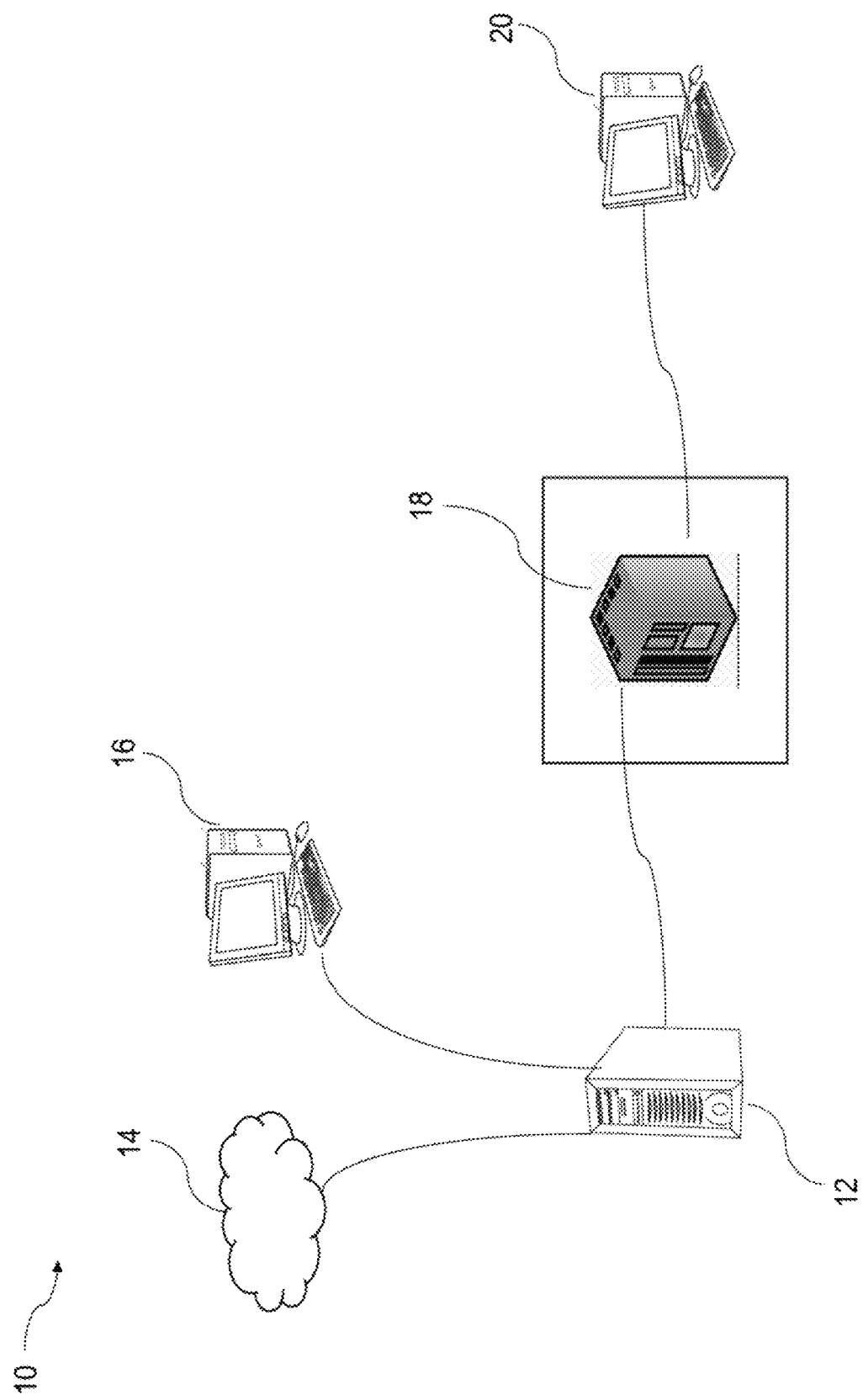
FIG. 1 is a schematic diagram of a system for data integrity validation, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal digital assistant, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to data integrity validation, and more particularly to systems, methods, and devices for allowing users to control access to their data across services and platforms. The present disclosure provides systems, methods, and devices for user-directed data integrity validation using black box devices and permission controls. The black box devices present in the system record data provided by users or otherwise gleaned from networks. However, according to permissions provided or otherwise agreed to by users, the data in the black box devices may only be accessed in certain ways.

In an embodiment, where third parties wish to access the data (for example, for marketing purposes), those third parties may not directly gain access to the data but may instead submit queries to the black box device to be performed and/or answered entirely locally. For example, where an advertiser wishes to know the locations of users who have recently performed a search for certain products and/or services, the advertiser submits a query to the black box device, which reviews the data stored internally and provides an answer (such as '50% of those users who searched for your product in Ontario live within the Greater Toronto Area') that does not implicate specific user data. As a further example, the black box device may not respond to a query that implicates specific user data (such as 'On what street does the person with the highest income who has searched for our product live?').

In an embodiment, the black box device excludes or holds back parts of responses that implicate specific user data while still providing the rest of a query response that does not.

Furthermore, users who provide data to the system herein disclosed may dynamically set permissions for third parties to have access to the user data. Such access may be recorded in a log, such as a metadata log, available to the user. Such third parties may be required to specify the use to which the user data (or answers to queries associated with the user data as previously described) will be put. The black box may verify the use after the user data is accessed within the black box device. In a further embodiment, answers to a query submitted to the black box device by a third party may only be provided with respect to the user data of users who have approved, either in advance or at the time, the use of their user data with respect to such queries.

Moreover, users may be compensated for the use of their data. Users may provide direct access to their user data in exchange for a monetary fee, a discount on associated products/services, and/or other forms of compensation. Users may, in addition to or instead of providing direct access to their user data, allow their user data to be used in responding to the queries submitted to the black box device as previously described. Such usage may be similarly compensated. Users may grant permission in response to specific bids or requests by third parties according to any one or more of the third party itself, the use to which the user data will be put, and the offered compensation. Users may set parameters in advance (for example, a minimum amount of compensation and/or accepting all but certain excluded uses). Users may respond to specific bids or requests. Users may interact with the system disclosed herein through a combination of preset parameters and dynamic responses to specific bids or requests.

In an embodiment, because the user data is never directly accessed, only the result of the query about the user data, the present invention advantageously provides an improvement in privacy over systems that permit direct access to the user data and/or permit copying thereof. Data interrogations are accordingly advantageously limited to those entities that have permission to use the user data, entities that have paid to use the data, and/or entities that ask sufficiently broad questions of the user data that anonymity is preserved.

The black box device is advantageously a secure data store for stored user data. Such user data may include voluntarily supplied information, information gathered from online activities, purchase patterns, movements, etc. The black box device may include a database for storing the user data. The black box device 18 may also include a permissions database that includes specific actions associated with each data type with respect to the user. These actions may be any one or more of elements like 'never share', 'share only with family', 'share only for 1 week', 'share only with authorized government requests', etc.

Accordingly, sharing the user data and/or providing access thereto is conditional on a per item basis and may further depend on the nature and/or identity of an end user inquiring as well as reasons provided by the end user. An additional filter blocks requests that are not sufficiently anonymized.

The systems, methods, servers, and devices described herein have physical existence and/or manifest a discernible physical effect or change. The systems, methods, servers, and devices described herein relate to the manual or productive arts, meaning those arts involving or concerned with applied and industrial sciences. The computer systems described herein have a material effect on the working of the invention and cooperate with other elements of the claimed invention.

Where the computer systems herein are programmed to run an algorithm, the computer processes the algorithm in a novel and inventive manner and the processing of the algorithm on the computer solves problems in the functioning of the computer. The computer and the algorithm form part of a single actual invention that solves a problem related to the manual or productive arts. Running the algorithms described herein on the computer improves the functioning of the computer, and the computer and the algorithm together form a single actual invention that solves a problem related to the manual or productive arts.

The functional improvement particular to the systems, methods, servers, and devices described herein includes but is not limited to saving backend processing and foreground display through providing the functionality of limiting access to stored user data via the black box device. Limiting access to the stored user data may advantageously avoid unnecessary transmission of large quantities of user data to many end users; because only data approved to be transmitted by the associated user and/or excluded query result data are so transmitted, the present systems, methods, devices, and servers advantageously perform fewer computer operations and/or less computer processing, thereby resulting in an increase in computer efficiency, compared to systems, methods, devices, and servers that lack the present novel and inventive functionality.

While the present disclosure describes the invention in the context of data integrity validation, the systems, methods, and devices provided herein may have further applications and different uses beyond those described herein, whether in the context of user privacy or otherwise (e.g., cybersecurity, financial transactions, conflicts of interest in professional firms).

Referring now to FIG. 1, shown therein is a data integrity validation system 10, in accordance with an embodiment. The system 10 includes a database server 12 for storing user data, which communicates with a network 14, a user device 16 for capturing and transmitting the user data to the database server 12, a black box device 18 for locally answering queries received from an end user device without revealing the stored user data, and an end user device 20 for transmitting the queries to the black box device 18.

The database server 12 receives the user data through the user device 16. For example, the user device 16 may receive user data from a user of the user device 16 to be transmitted to the database server 12. The user data may deliberately be provided by the user (who may wish to provide their user data to the database server 12 in order to gain access to the benefits therefrom herein disclosed). The provision of the user data may further be incidental on the part of the user in the course of accessing other goods and services. Such other goods and services may be affiliated with the system 10. Such other goods and services may not be affiliated with the system 10.

The database server 12 receives the user data through the network 14. In an embodiment, the network 14 is the Internet.

The database server 12 further transmits the user data to the black box device 18. The database server 12 may automatically transmit all the user data received to the black box device. The database server 12 may only transmit unique user data (for example, not transmitting the same user data multiple times). The database server 12 may only transmit certain user data to the black box device 18. Such transmission may occur according to filters and/or other parameters configured in advance, periodically updated, or both, as to the relevance and/or value of the user data received at the user device 16. Such filters and/or other parameters may involve the application of artificial intelligence or machine learning. The database server 12 may be configured to update the user data at the black box device 18. The database server 12 may be configured to send the user data to the black box device 18 in response to a request from the black box device 18. The request may be for particular user data, for a particular class of user data, and/or for all the user data. The foregoing modes of transmitting user data from the database server 12 to the black box device 18 are not mutually exclusive, and further modes of transmission may be utilized.

Other methods for collecting and further creating data for possible transmission through the previously mentioned filters to the black box device 18 include through an application or web service such as a shopping or information portal, through a connection to an affinity program that details purchases and interest by specific persons, through social media channels that log interest in specific products and activities, through questionnaires, through gamified interfaces or web plug-ins, through communications content (e.g., email, voice capture) of individuals, and through geolocation for affiliation with visiting specific places.

The devices 12, 16, 18, 20 may be a server computer, node computing device, embedded device, desktop computer, notebook computer, tablet, PDA, smartphone, or another computing device. The devices 12, 16, 18, 20 may include a connection with the network 14 such as a wired or wireless connection to the Internet. In some cases, the network 14 may include other types of computer or telecommunication networks. The devices 12, 16, 18, 20 may include one or more of a memory, a secondary storage device, a processor, an input device, a display device, and an output device. Memory may include random access memory (RAM) or similar types of memory. Also, memory may store one or more applications for execution by a processor. Applications may correspond with software modules comprising computer executable instructions to perform processing for the functions described below. The secondary storage device may include a hard disk drive, floppy disk drive, CD drive, DVD drive, Blu-ray drive, or other types of non-volatile data storage. The processor may execute applications, computer readable instructions, or programs. The applications, computer readable instructions, or programs may be stored in memory or in secondary storage or may be received from the Internet or other network 14.

The input device may include any device for entering information into the devices 12, 16. For example, the input device may be a keyboard, keypad, cursor-control device, touchscreen, camera, or microphone. The display device may include any type of device for presenting visual information. For example, the display device may be a computer monitor, a flat-screen display, a projector, or a display panel. The output device may include any type of device for presenting a hard copy of information, such as a printer, for example. The output device may also include other types of output devices such as speakers, for example. In some cases, the devices 12, 16, 18 may include multiple of any one or more of processors, applications, software modules, secondary storage devices, network connections, input devices, output devices, and display devices.

Although devices 12, 16, 18, 20 are described with various components, one skilled in the art will appreciate that the devices 12, 16, 18, 20 may in some cases contain fewer, additional, or different components. In addition, although aspects of an implementation of the devices 12, 16, 18, 20 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 16, 18, 20 and/or processor to perform a particular method.

The devices 12, 16, 18, 20 can be described performing certain acts. It will be appreciated that any one or more of these devices may perform an act automatically or in response to an interaction by a user of that device. That is, the user of the device may manipulate one or more input devices (e.g., a touchscreen, a mouse, a button) causing the device to perform the described act. In many cases, this aspect may not be described below but will be understood.

As an example, it is described below that the devices 12, 16, 18, 20 may send information to one or more other device 12, 16, 18, 20. For example, a user using the user device 16 may manipulate one or more inputs (e.g., a mouse and a keyboard) to interact with a user interface displayed on a display of the device 16. Generally, the device may receive a user interface from a network (e.g., in the form of a webpage). Alternatively, or in addition, a user interface may be stored locally at a device (e.g., a cache of a webpage, a mobile application).

The devices 12, 16, 18, 20 may be configured to receive a plurality of information, from another one or more of the plurality of devices 12, 16, 18, 20.

In response to receiving information, the respective device 12, 16, 18, 20 may store the information in a storage database. The storage may correspond with secondary storage of one or more other devices 12, 16, 18, 20. Generally, the storage database may be any suitable storage device such as a hard disk drive, a solid-state drive, a memory card, or a disk (e.g., CD, DVD, Blu-ray). Also, the storage database may be locally connected with the device 12, 16, 18, 20. In some cases, the storage database may be located remotely from the device 12, 16, 18, 20 and accessible to the device 12, 16, 18, 20 across a network, for example. In some cases, the storage database may comprise one or more storage devices located at a networked cloud storage provider.

The database server 12 may be a purpose-built machine designed specifically for storing the user data and other related information received through the network 14 and/or the user device 16.

The network 14 captures the user data. The user data may include information pertaining to a single user or to a variety of users. The information may be voluntarily provided by the users about themselves or about others. The information may also be collected based on available user data, such as websites visited, keywords searched, products or services purchased, and electronic social interactions. The information may be a combination of information voluntarily provided and information collected according to the foregoing. The network 14 may be configured to capture all available user data and to forward all the available user data directly to the database server 12. Alternately, the network 14 and/or the database server 12 may be configured with filters, parameters, artificial intelligence, or machine learning capabilities to only forward certain user data based on relevance, value, etc. Such filters, parameters, etc. may be hardcoded upon initialization, preset by users and/or end users, and/or dynamically updated by users and/or end users.

The user device 16 includes a user interface component (or module) (e.g., a human-machine interface). The user device 16 is configured to capture the user data. The user data may include information pertaining to a single user or to a variety of users. The information may be voluntarily provided by the users about themselves or about others. The information may also be collected based on available user data, such as websites visited, keywords searched, products or services purchased, and electronic social interactions. The user device 16 may be configured to capture all available user data and to forward all the available user data directly to the database server 12. Alternately, the user device 16 and/or the database server 12 may be configured with filters, parameters, artificial intelligence, or machine learning capabilities to only forward certain user data based on relevance, value, etc. Such filters, parameters, etc. may be hardcoded upon initialization, preset by users and/or end users, and/or dynamically updated by users and/or end users.

The user interface component of the user device 16 may also render one or more user interface elements for receiving direct input from the user. For example, the user interface component may provide a yes/no or similar binary option for receiving user input data indicating a selection of an option. In an embodiment, the database server 12 may be configured to ask questions to or perform a survey on the user and store the associated answers or survey data.

The black box device 18 receives the user data from the database server 12. The black box device 18 further receives queries from an end user device 20. The end user device 20 may be configured for use by, for example, marketing companies or advertisers.

In an embodiment, the black box device 18 includes a memory (not shown) for storing the user data, data filters, filtered data, the queries received from the end user device, results of the queries, and excluded query result data. The black box device 18 further includes a processor (not shown) in communication with the memory and configured to generate the filtered data based on the stored user data and the data filters. The processor is further configured to determine whether each query received that addresses the filtered data is permitted based on properties of the query. The processor is further configured to determine whether the query, if answered locally, would produce a result that would facilitate identifying any particular user. The processor is further configured to provide a response to each permitted query based on the generated filtered data. The processor is further configured to generate the excluded query result data by excluding non-permitted stored user data and stored user data that would facilitate identifying any particular user from the response to each permitted query. The processor is further configured to transmit the excluded query result data to the end user device.

All information received by the black box device 18 from the database server 12, including the user data, remains local to the black box device 18. Such information is not further forwarded or transmitted to the end user device 20 and cannot leave the black box device 18. Accordingly, when the end user device 20 sends a query to the black box device 18, the black box device 18 conducts analysis of the user data internally and answers the query locally. That answer, without any of the user data, is then transmitted back to the end user device 20. In this fashion, the user data originally transmitted by the network 14 and/or by the user device 16 remains confidential and hidden with respect to the end user device 20. Accordingly, the black box device 18 may be considered to generate other data and/or metadata with respect to the user data, and only the other data and/or the metadata is transmissible from the black box device 18 to the end user device 20.

In an embodiment, the end user device 20 is configured to receive the queries from an end user, transmit the queries to the black box device, and display the excluded query result data to the end user.

In an embodiment, the end user device 20 is configured to ask questions as to the geographical locations or socioeconomic strata of users who may be interested in the end user's products or services. Such users may be identified according to online interaction with the end user or recent purchases of the end user's products or services. As an example, the end user may query through the end user device 20 the average yearly income of all implicated end users or the cities in which the largest clusters of implicated end users may be found. The black box device 18 may receive this query and may review the data received from the database server 12. The black box device 18 may have already received the data or may request transmission or updating of the data from the database server 12. The black box device 18 may request further data from the database server 12 to respond to the query. The black box device 18 calculates an answer to the query and transmits the answer back to the end user device 20 without revealing personal or identifying information of the users. For example, the black box device 18 may respond that the average yearly income queried is $60,000 without revealing the income of any users. As a further example, the black box device 18 may respond that the largest clusters of users implicated are in Toronto, Montreal, and Vancouver, without revealing the actual location of any particular user.

The end user may be able to specify further parameters of the data to be considered within the black box device 18 in answering the query. For example, such data may be limited to data received or updated within the last 12 months.

In another embodiment, the end user device 20 may provide information to the black box device 18 as to the identity of the end user and/or the proposed use of the user data, as well as the timing of queries. Such information may then be transmitted to the user through the network 14 and/or the user device 16. The user corresponding to the user data may be able to set permissions in advance or grant permission for their data to be used by the black box device 18 to answer the query at the time of answering the query or in advance thereof. These permissions may take the form of a permissions matrix.

In an embodiment, the permissions matrix stores circumstances under which the user allows the user data to be used to respond to the queries, and the user data is not used to respond to the queries unless circumstances provided by the end user device 20 are included in the permissions matrix.

Permissions granted by the user may be compared with the information provided by the end user to prevent unauthorized use and produce an audit trail for the owner of the user data. The audit trail may include a metadata log. The permissions may be dynamically updated such that the owner of the user data may authorize only specific uses of the user data once a request by an end user is made. For example, the permissions may include a permission item that prevents marketing research from using the user data but allows charitable organizations to do so.

Upon comparison of permissions, the end user may either be granted or denied the use of the data in generating the query result.

The system 10, specifically the black box device 18, may supervise the use to which the user data is put to confirm compliance both with the parameters of the end user's initial query and with the permissions specified by the user.

The storing of user-granted permissions and/or the comparison(s) therewith may take place on the black box device 18 or elsewhere within the system 10. The permission matrix may be stored in a database format with data elements identified by type. For example, a data type may be "Annual Income" with a numerical value for a particular person of $80,000. The permission matrix may have a corresponding element with a field value, for example any one of "Do not disclose", "Disclose only to charities", "Disclose only to registered banks", "Disclose only for fee of $1 or more". An inquiry generates a response according to both the data value and the response type. In an embodiments, the field values include logical expressions produced through IF, AND, OR, and/or NOT operators, for example, "Disclose to charities" AND NOT "Disclose to Municipal Government", or "Disclose to bank" IF "In USA".

In another embodiment, access to user data is provided in exchange for payment by the end user, which is then remitted entirely or in part to the user. For example, the user may specify a minimum dollar amount for direct access to their user data or a different, perhaps lesser, amount to include their user data in the non-identifying excluded query result data. These prices and whether the end user has paid these prices may form a kind of data filter. For example, a user may assign elements to their "Annual Income" data of "Disclose only for fee of $10 or more" IF "non-anonymous disclosure" and "Disclose only for fee of $1 or more" IF "anonymous disclosure". In the foregoing example, the user has previously indicated permission to disclose their precise annual income if paid at least $10 for that data and permission to disclose their annual income in an anonymous fashion (e.g., as an answer to the question "What is the average yearly income of all people who have purchased my product at least once?") if paid at least $1. It will be appreciated that further variations of fully or partially anonymous or non-anonymous disclosure are expressly contemplated, e.g., agreeing to the disclosure of one's income to respond to the foregoing question as part of a median rather than a mean average such that the end user would see a list of all incomes of all people who have purchased the product at least once and thus see the precise income of the user but not learn the user's identity. In such an example, the user may further specify permissions of "Disclose only for fee of $1 or more" IF "anonymous disclosure" AND "aggregation of data" (e.g., to generate a mean average), "Disclose only for fee of $5 or more" IF "anonymous disclosure" AND "non-aggregation of data" (e.g., to generate a median average such that the user's precise datum but not their identity will be provided to the end user), and "Disclose only for fee of $10 or more" IF "non-anonymous disclosure" (e.g., to disclose both the user's precise datum and their identity to the end user).

The minimum dollar amounts may be fixed or variable in respect of the user data or otherwise. For example, the user may specify a minimum dollar amount for access to any datum, may charge different amounts for different data, and/or may charge different amounts depending on the end user or the proposed use of the data.

Accordingly, in an embodiment, the black box device 18 further includes a minimum bid amount for which the user allows the user data to be used to respond to the queries. The user data is not used to respond to the queries unless a bid by the end user meets or exceeds the minimum bid amount.

The price of an inquiry is thus calculated and the end user is advised as to the cost of 'running' such an inquiry. Upon payment of the fee, an inquiry is run and the result delivered to the end user in respect of only those users whose minimum bid amount has been paid by the end user.

Fees may be set based on the specificity of the inquiry in groups or buckets. For example, a widespread query for all Canadians may have a very small fee per user data point, whereas an inquiry that specifies a city or neighbourhood may command a higher fee.

In an embodiment, the price is a market or "floating" price, and the price is set by an algorithm designed to set prices for maximum market activity. Thus, prices are set to a level that ensures the best compromise between end user and data owner (user). Such a market pricing scheme is advantageously sensitive to numbers of buyers and sellers, generality of the queries, historic pricing, and demand for data.

The user may specify minimum dollar amounts in advance to be updated from time to time and/or dynamically. The user may answer particular end user requests for the user data through the network 14 and/or the user device 16 via the black box device 18 and the end user device 20. In an embodiment, requests for access to the user data (and excluded query result data based thereon) are automatically denied unless the user accepts a bid for information from the end user.

An end user may make a general query for information and an associated bid and may specify data to which access is to be purchased (temporarily or otherwise), after which time the bidding ceases.

The system 10 may be configured to maximize user revenue (e.g., by not accepting any bids less than the associated minimum dollar amount but automatically accepting all bids greater than the associated dollar amount), to minimize end user expenditure (e.g., where an end user overbids, the system 10 only charges the end user the associated minimum dollar amount), or otherwise. The system 10 may charge a fee for these and other services.

The storing of minimum dollar amounts associated with the user data and/or the comparison(s) of end user bids therewith may take place on the black box device 18 or elsewhere within the system 10.

Figure 2:
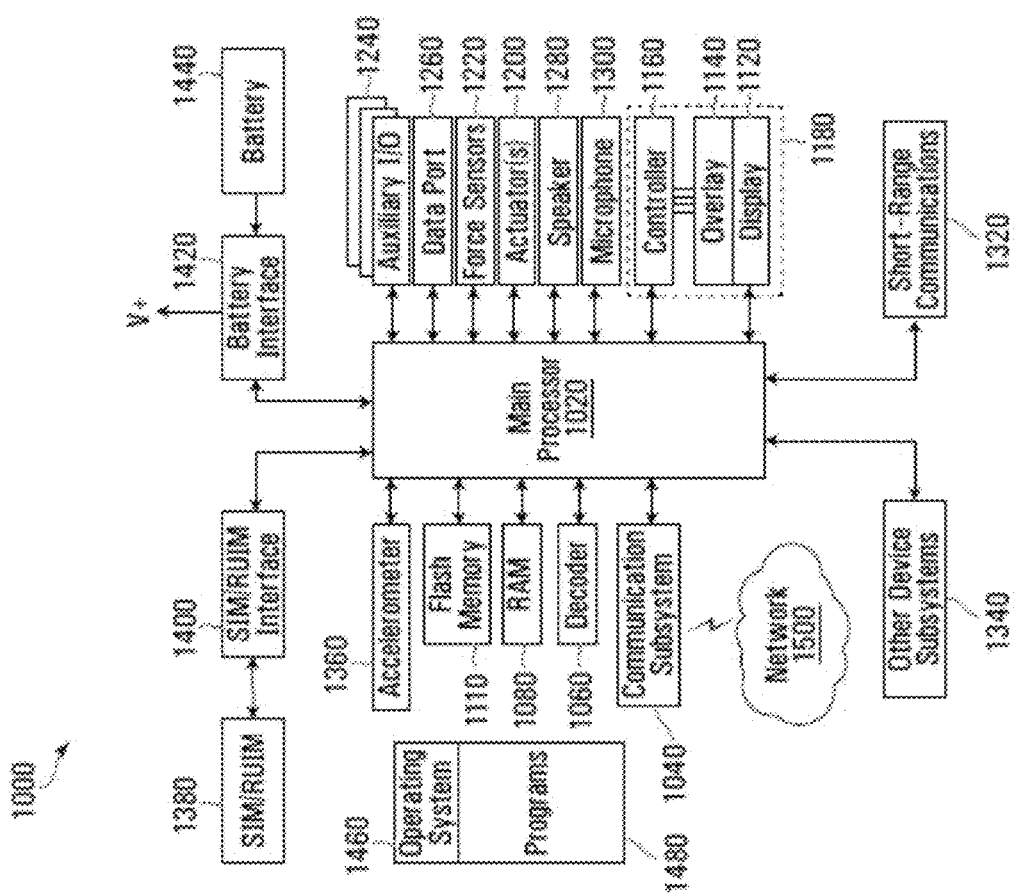
FIG. 2 is a block diagram of a computing device of the present disclosure, according to an embodiment.

Referring now to FIG. 2, shown therein is a block diagram of a computing device 1000 of the system 10 of FIG. 1, according to an embodiment. The computing device 1000 may be, for example, any one of devices 12, 16, 18 of FIG. 1.

The computing device 1000 includes multiple components such as a processor 1020 that controls the operations of the computing device 1000. Communication functions, including data communications, voice communications, or both may be performed through a communication subsystem 1040. Data received by the computing device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The computing device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1110, a display 1120 (e.g., with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a computing device generated by the processor 1020 may be displayed on the touch-sensitive display 1180.

The processor 1020 may also interact with an accelerometer 1360. The accelerometer 1360 may be utilized for detecting direction of gravitational forces or gravity-induced reaction forces.

To identify a subscriber for network access according to the present embodiment, the computing device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1110 or performed using other techniques.

The computing device 1000 also includes an operating system 1460 and software components 1480 that are executed by the processor 1020 and which may be stored in a persistent data storage device such as the flash memory 1110. Additional applications may be loaded onto the computing device 1000 through the wireless network 1500, the auxiliary I/O subsystem 1240, the data port 1260, the short-range communications subsystem 1320, or any other suitable device subsystem 1340.

In use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the computing device 1000 may be similar. The speaker 1280 may output audible information converted from electrical signals, and the microphone 1300 may convert audible information into electrical signals for processing.

Figure 3:
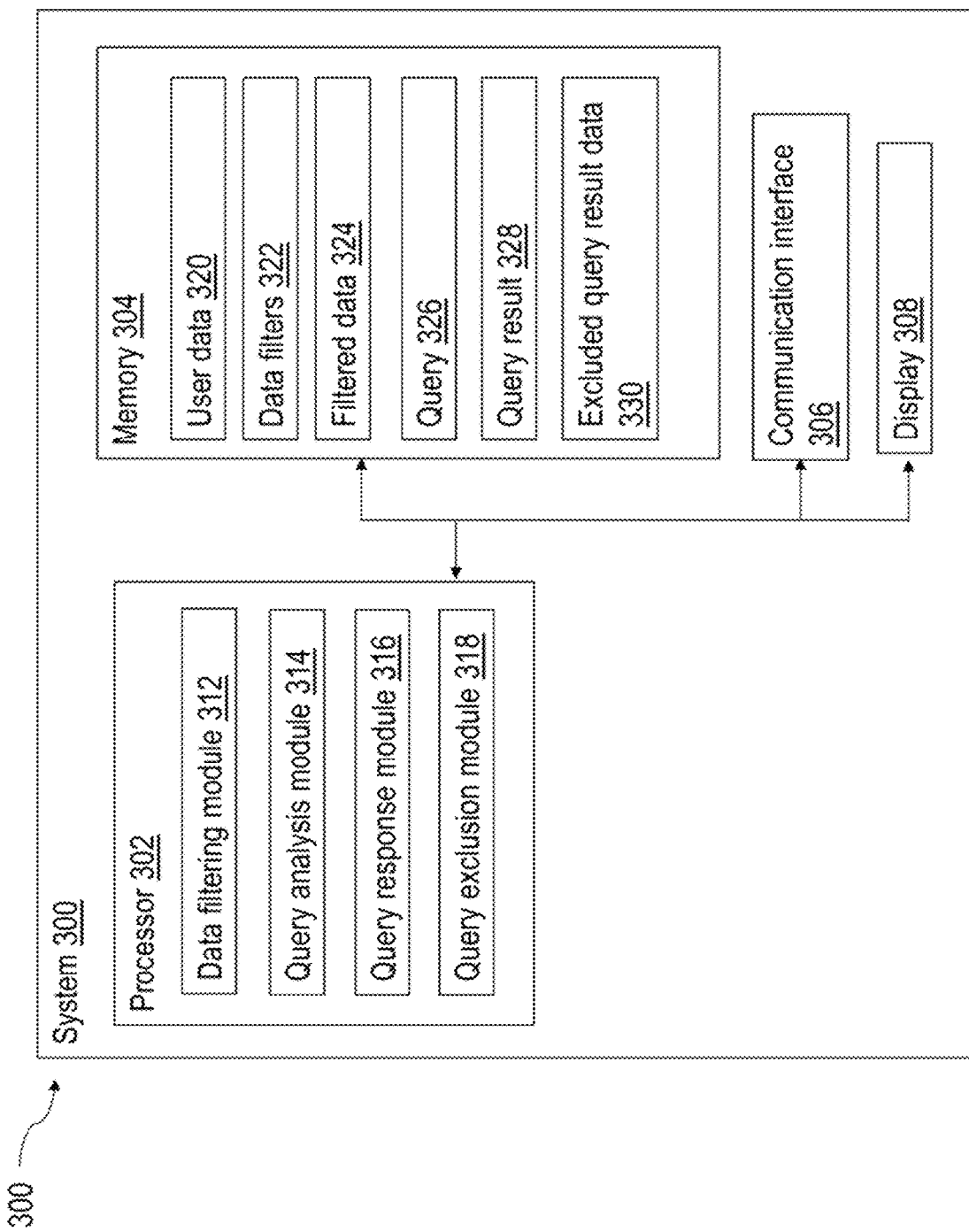
FIG. 3 is a block diagram of the system for data integrity validation of FIG. 1, according to an embodiment.

Referring now to FIG. 3, shown therein is a block diagram of a system 300 for implementing data integrity validation.

The system 300 includes a processor 302, a memory 304, a communication interface 306 for interacting with the end user, and a display 308 for displaying the results of a query to the end user.

The memory 304 includes user data 320. The user data 320 may include any or all of the user data of the database server 12 of FIG. 1.

The memory 304 further includes data filters 322 for filtering the user data 320 on the basis of relevance, interest, value, etc. The data filters 322 may be hardcoded, preset by the user and/or end user, and/or dynamically updated by the user and/or end user.

The processor 302 includes a data filtering module 312 for applying the data filters 322 to the user data 320 to generate filtered data 324. The filtered data 324 is stored in the memory 304.

The memory 304 further includes a query 326 received within the system 300. The query 326 is generated and transmitted, for example by the end user device 20, through the communication interface 306.

The processor 302 includes a query analysis module 314 for analyzing the query 326 and determining what filtered data 324 will satisfy the query 326. This analysis may be performed through NLP, AI, machine learning, etc. This analysis includes determining whether the end user query 326 is permitted. This analysis includes determining whether the end user query 326, if answered locally, would produce a result that would facilitate identifying any particular user.

In an embodiment, the permission matrix is stored in a database format with data elements identified by type. For example, a data type may be "Annual Income" with a numerical value for a particular person of $80,000. The permission matrix may have a corresponding element with a field value, for example any one of "Do not disclose", "Disclose only to charities", "Disclose only to registered banks", "Disclose only for fee of $1 or more". An inquiry generates a response according to both the data value and the field values. In an embodiment, the field values include logical expressions produced through IF, AND, OR, and/or NOT operators, for example, "Disclose to charities" AND NOT "Disclose to Municipal Government", or "Disclose to bank" IF "In USA".

The processor 302 further includes a query response module 316 for responding to the query 326 on the basis of the result of the query analysis module 314 and the filtered data 324. The query response module 316 generates a result for the query, which is stored in the memory 304 at query result 328.

The processor 302 further includes a query exclusion module 318 for excluding specific, user-identifying data from the query result 328. This exclusion may be based on general principles concerning digital anonymity, on applicable privacy legislation, and/or on the data filters 322 as hardcoded, preset, and/or dynamically updated within the system 300. The exclusion is configured according to the limits that a user has placed on their privacy to set the limit to which the query 326 can identify a specific individual. The query result 328 is analyzed to determine how many individuals have a positive result to the query 326. The number of individuals with the positive result to the query 326 is compared to a personal identification threshold. For example, if 3 individuals were identified as relevant or responsive for the query 326, the query 326 may be sufficiently narrow to block the query results 328 according to the limits that the user has placed on their privacy. If the query 326 has 1000 individuals identified as relevant or responsive, the user is sufficiently anonymized to give permission to use the user data. The user may be able to select the desired threshold to preserve anonymity.

In addition, thresholds may be based on privacy legislation, for example not being able to determine the location of an individual with greater granularity than a district or city block.

The result of processing by the query exclusion module 318 on the query result 328 is stored in the memory 304 as excluded query result data 330.

The excluded query result data 330 is provided to the end user, either through display at the display 308 or otherwise. Accordingly, the end user is able to see the excluded query result data 330, i.e., the query result 328 after inappropriately identifying information has been removed therefrom. Information excluded from the query result 328 is not provided to the end user.

Advantageously, the foregoing embodiment prevents the transmission of any specific, user-identifying data of any users to the end user. Accordingly, the end user is able to receive answers to specific queries generated by detailed analysis on the user data without the anonymity or privacy of the users being compromised.

Figure 4:
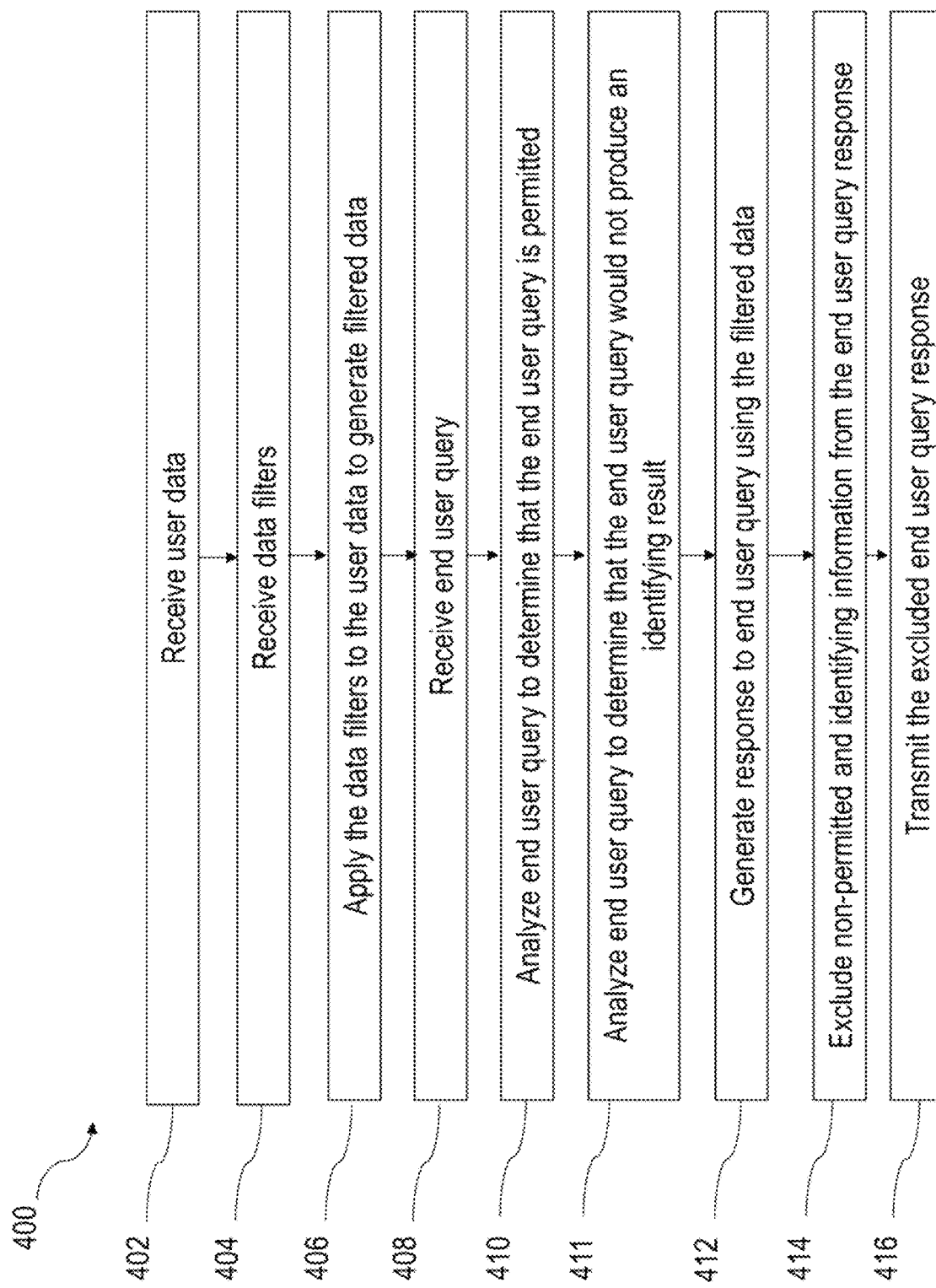
FIG. 4 is a flow diagram of a method of drawing inferences from user data without copying the user data, according to an embodiment.

Referring now to FIG. 4, shown therein is a method 400 of using user data and data filters to respond to an end user query.

At 402, user data 320 is received, for example from the network 14 or the user device 16.

At 404, data filters 322 are received.

At 406, the data filters 322 are applied to the user data 320 to generate filtered data 324.

At 408, an end user query 326 is received, for example from the end user device 20.

At 410, the end user query 326 is analyzed at the query analysis module 314 to determine that the end user query 326 is permitted.

At 411, the end user query 326 is analyzed at the query analysis module 314 to determine that the end user query 326, if answered locally, would not produce a result that would facilitate identifying any particular user.

At 412, a query result 328 is generated at the query response module 318. Such generation may take place according to the filtered data 324.

At 414, non-permitted user data and user data that would facilitate identifying any particular user are excluded from the query result 328 to generate excluded query result data 330.

At 416, the excluded query result data 330 is transmitted to the end user device 20.

The method 400 may include storing circumstances under which the user allows the user data to be used to respond to the query in a permissions matrix and not allowing the user data to be used to respond to the query unless circumstances provided by the end user are included in the permissions matrix.

The method 400 may include allowing the user data to be used to respond to the queries when a bid by the end user exceeds a minimum bid amount and not allowing the user data to be used to respond to the query if the bid by the end user does not meet or exceed the minimum bid amount.

Figure 5:
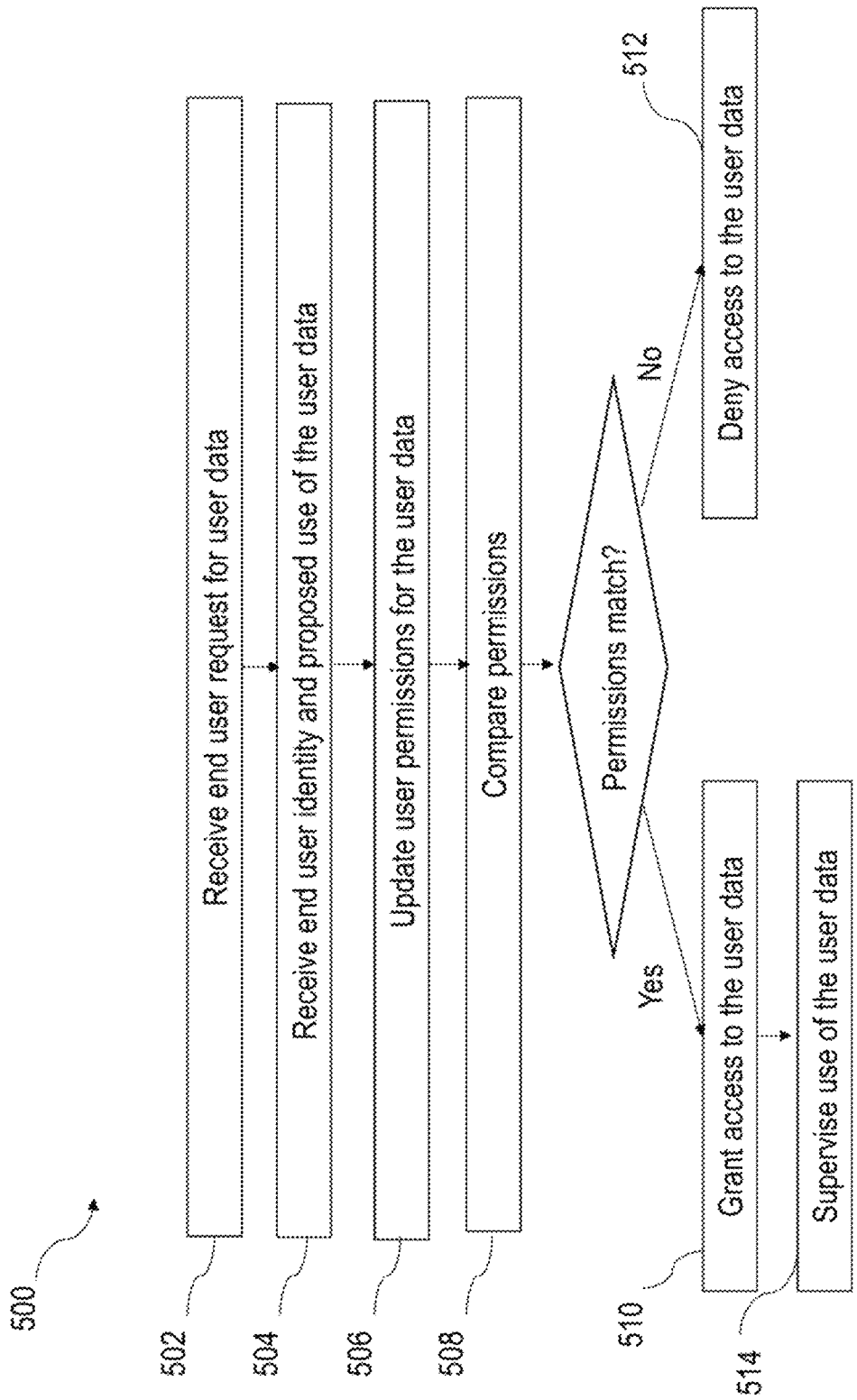
FIG. 5 is a flow diagram of a method of granting users control over who may use their data and how that data may be used, according to an embodiment.

Referring now to FIG. 5, shown therein is a method 500 for determining access to user data according to an end user request and based on permissions.

At 502, the end user request for access to the user data is received.

At 504, details on the end user and the request are received, such as the end user identity and the proposed use of the user data.

At 506, the user permissions for the user data are updated. This may include querying the user for new or current user permissions.

At 508, permissions granted by the user are compared with the details provided by the end user.

At 510, access to the user data is granted based on the comparison if the permissions match, i.e., if the end user details are included within the scope of the user permissions.

At 512, access to the user data is denied based on the comparison if the permissions do not match.

At 514, the use to which the user data is put is supervised.

Figure 6:
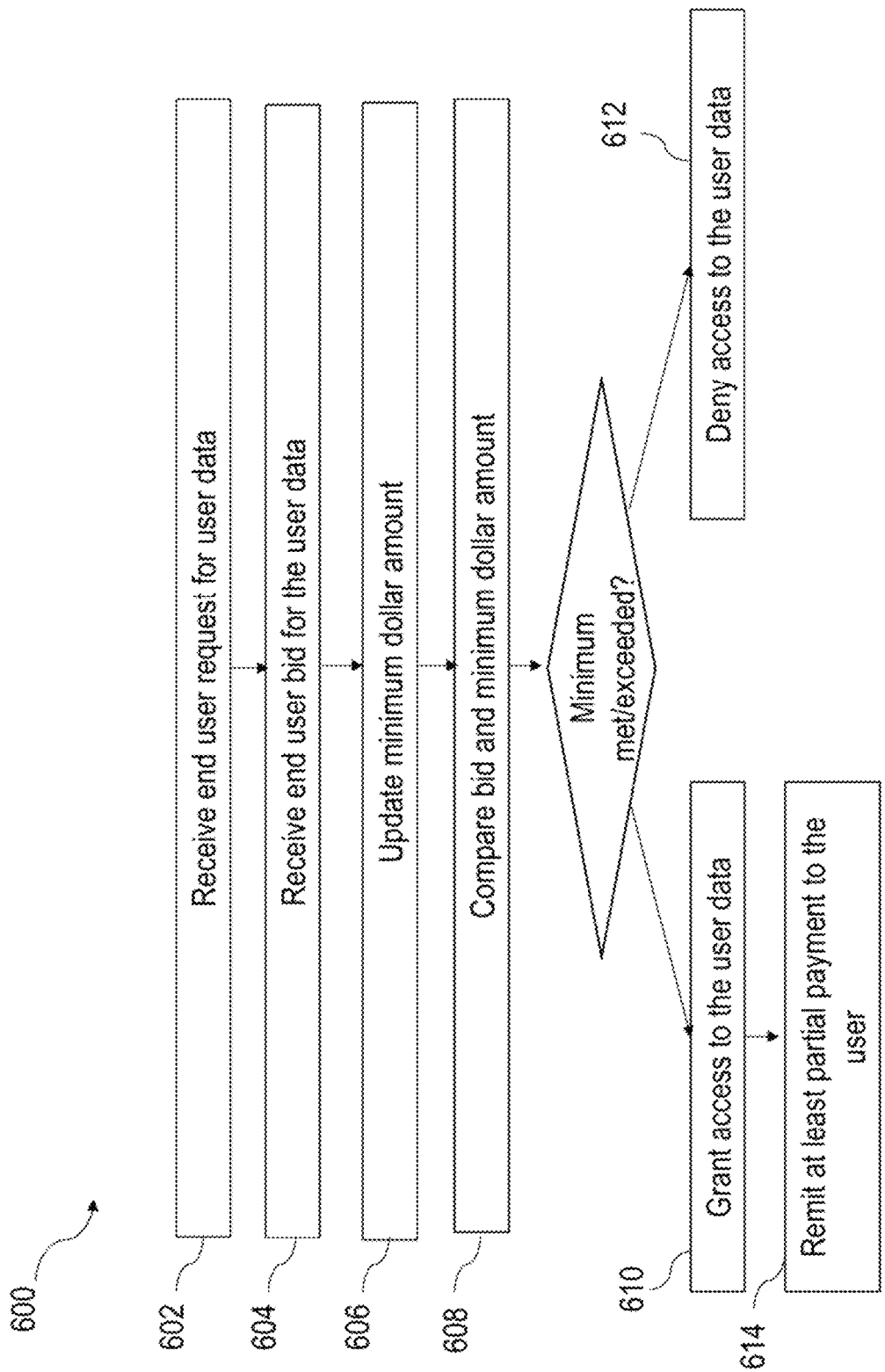
FIG. 6 is a flow diagram of a method of using data marketplace pricing to facilitate user-directed transactions involving user data, according to an embodiment.

Turning now to FIG. 6, shown therein is a method 600 for determining access to user data according to an end user request and based on bidding.

At 602, the end user request for access to the user data is received.

At 604, a financial bid by the end user for the user data is received.

At 606, a minimum dollar amount associated with the user data is updated from the user.

At 608, the end user bid and the user minimum dollar amount are compared.

At 610, access to the user data is granted based on the comparison if the end user bid meets or exceeds the minimum dollar amount.

At 612, access to the user data is denied based on the comparison if the end user bid does not meet or exceed the minimum dollar amount.

At 614, at least partial payment is remitted to the user according to the end user bid.

It will be appreciated that, in an embodiment, the methods 500 and 600 are combined such that access to the user data is granted or denied based on a comparison of the permissions (i.e., whether the end user details are included within the scope of the user permissions) and a comparison of the end user bid and the user-provided minimum dollar amount.

It will be appreciated that, in an embodiment, the method 500, the method 600, or the combined method according to the methods 500 and 600 may further include all or part of the method 400 to be performed upon access to the user data being granted.

It will be appreciated that, in an embodiment, 410 of the method 400 may include performing one or both of all or part of the methods 500 and/or 600.

It will be appreciated that, in an embodiment, 411 of the method 400 may include performing one or both of all or part of the methods 500 and/or 600.

While the above description provides examples of one or more apparatus, methods, or systems, it will be appreciated that other apparatus, methods, or systems may be within the scope of the claims as interpreted by one of skill in the art.

The invention claimed is:

1. A system for data integrity validation, the system comprising:
   a user database for storing user data of a user;
   a black box device for locally answering queries received from an end user device without revealing the stored user data, the black box device comprising:
      a memory for storing the user data, data filters, filtered data, the queries received from the end user device, results of the queries, and excluded query result data; and
      a processor in communication with the memory, the processor configured to:
         generate the filtered data based on the stored user data and the data filters;
         determine whether each query received that addresses the filtered data is permitted based on properties of the query;
         determine whether the query, if answered locally, would produce a result that would facilitate identifying any particular user;
         provide a response to each permitted query based on the generated filtered data;
         generate the excluded query result data by excluding from the response to each permitted query non-permitted stored user data and stored user data that would facilitate identifying any particular user; and
         transmit the excluded query result data to the end user device;
      the end user device configured to:
         receive the queries from an end user;
         transmit the queries to the black box device; and
         display the excluded query result data to the end user;
      wherein the black box device further comprises a permissions matrix for storing circumstances under which the user allows the user data to be used to respond to the queries and wherein the user data is not used to respond to the queries unless circumstances provided by the end user device are included in the permissions matrix.

2. The system of claim 1, wherein the permissions matrix notifies the user when the circumstances provided by the end user device are not included in the permissions matrix, and wherein the permissions matrix is configured to receive permission from the user to allow the user data to be used to respond to the queries when the circumstances provided by the end user device are included in the permissions matrix.

3. The system of claim 1, wherein use by the end user of the excluded query result data is audited to confirm that the use by the end user matches the circumstances provided by the end user device.

4. The system of claim 1, wherein the black box device further comprises a minimum bid amount for which the user allows the user data to be used to respond to the queries and wherein the user data is not used to respond to the queries unless a bid by the end user device meets or exceeds the minimum bid amount.

5. The system of claim 4, wherein the minimum bid amount includes a first minimum bid amount for anonymous disclosure of the user data, a second minimum bid amount for semi-anonymous disclosure of the user data, the second minimum bid amount being higher than the first minimum bid amount, and a third minimum bid amount for non-anonymous disclosure of the user data, the third minimum bid amount being higher than the second minimum bid amount.

6. The system of claim 1 further comprising a user device for providing the user data.

7. The system of claim 1, wherein the user data is gathered from any one or more of online activities of the user, purchase patterns of the user, and physical movement of the user.

8. A method for facilitating data integrity validation, the method comprising:
   receiving user data pertaining to one or more users;
   receiving data filters to be applied to the user data;
   applying the data filters to the user data to generate filtered data;
   receiving a query from an end user device;
   determining that the query received is permitted based on properties of the query;
   determining that the query, if answered locally, would not produce a result that would facilitate identifying any particular user;
   providing a response to the permitted query using the filtered data;
   generating excluded query result data by excluding from the response to each permitted query non-permitted user data and user data that would facilitate identifying any particular user;
   transmitting the excluded query result data to the end user; and
   storing circumstances under which the user allows the user data to be used to respond to the query in a permissions matrix and not allowing the user data to be used to respond to the query unless circumstances provided by the end user are included in the permissions matrix.

9. The method of claim 8, further comprising:
   the permissions matrix notifying the user when the circumstances provided by the end user device are not included in the permissions matrix; and
   the permissions matrix receiving permission from the user to allow the user data to be used to respond to the queries when the circumstances provided by the end user device are included in the permissions matrix.

10. The method of claim 8 further comprising auditing use by the end user of the excluded query result data to confirm that the use by the end user matches the circumstances provided by the end user device.

11. The method of claim 8 further comprising allowing the user data to be used to respond to the queries when a bid by the end user device meets or exceeds a minimum bid amount and not allowing the user data to be used to respond to the query if the bid by the end user does not meet or exceed the minimum bid amount.

12. The method of claim 11, wherein the minimum bid amount includes a first minimum bid amount for anonymous disclosure of the user data, a second minimum bid amount for semi-anonymous disclosure of the user data, the second minimum bid amount being higher than the first minimum bid amount, and a third minimum bid amount for non-anonymous disclosure of the user data, the third minimum bid amount being higher than the second minimum bid amount.

13. A black box device for locally answering queries received from an end user device without revealing stored user data, the black box device comprising:
   a memory for storing the user data of a user, data filters, filtered data, the queries received from the end user device, results of the queries, and excluded query result data; and a processor in communication with the memory, the processor configured to:
- generate the filtered data based on the stored user data and the data filters;
- determine whether each query received that addresses the filtered data is permitted based on properties of the query;
- determine whether the query, if answered locally, would produce a result that would facilitate identifying any particular user;
- provide a response to each permitted query based on the generated filtered data;
- generate the excluded query result data by excluding from the response to each permitted query non-permitted stored user data and stored user data that would facilitate identifying any particular user; and
- transmit the excluded query result data to the end user device; and a permissions matrix for storing circumstances under which the user allows the user data to be used to respond to the queries, wherein the user data is not used to respond to the queries unless circumstances provided by the end user are included in the permissions matrix.

14. The device of claim 13, wherein the permissions matrix notifies the user when the circumstances provided by the end user device are not included in the permissions matrix, and wherein the permissions matrix is configured to receive permission from the user to allow the user data to be used to respond to the queries when the circumstances provided by the end user device are included in the permissions matrix.

15. The device of claim 13, wherein use by the end user of the excluded query result data is audited to confirm that the use by the end user matches the circumstances provided by the end user device.

16. The device of claim 13 further comprising a minimum bid amount for which the user allows the user data to be used to respond to the queries, wherein the user data is not used to respond to the queries unless a bid by the end user device meets or exceeds the minimum bid amount.

17. The device of claim 16, wherein the minimum bid amount includes a first minimum bid amount for anonymous disclosure of the user data, a second minimum bid amount for semi-anonymous disclosure of the user data, the second minimum bid amount being higher than the first minimum bid amount, and a third minimum bid amount for non-anonymous disclosure of the user data, the third minimum bid amount being higher than the second minimum bid amount.

* * * * *